United States Patent [19]
Moncrief et al.

[11] Patent Number: 5,197,003
[45] Date of Patent: Mar. 23, 1993

[54] GEARSHIFT FOR A VEHICLE SIMULATOR HAVING A SOLENOID FOR IMPOSING A RESISTANCE FORCE

[75] Inventors: Rick L. Moncrief, San Jose; Max L. Behensky, Hayward; Erik J. Durfy, Los Gatos; Jacques D. Aknin, San Carlos, all of Calif.

[73] Assignee: Atari Games Corporation, Milpitas, Calif.

[21] Appl. No.: 865,782

[22] Filed: Apr. 7, 1992

Related U.S. Application Data

[63] Continuation of Ser. No. 561,086, Aug. 1, 1990, abandoned.

[51] Int. Cl.⁵ .................... G06F 15/44; G05B 13/04; G09B 9/02; G09B 9/04
[52] U.S. Cl. .................... 364/410; 434/71; 434/45; 273/85 G; 273/85 B; 364/150; 364/424.1
[58] Field of Search .............. 364/578, 410, 424.1, 364/550, 551.01, 148-150; 434/71, 45; 273/148 B, 85 R, 85 G; 74/475, 491; 192/3.51, 3.63

[56] References Cited

U.S. PATENT DOCUMENTS

| | | |
|---|---|---|
| 2,751,054 | 6/1956 | Del Re, Sr. . |
| 2,909,940 | 10/1959 | Dawkins . |
| 2,959,261 | 11/1960 | Hemphill . |
| 3,492,889 | 2/1970 | Hauff . |
| 3,740,870 | 6/1973 | Acker et al. . |
| 3,896,564 | 7/1975 | Dewey et al. . |
| 3,936,955 | 2/1976 | Gruen et al. .............. 434/71 X |
| 3,942,614 | 3/1976 | Thompson . |
| 4,034,484 | 7/1977 | Radice . |
| 4,141,258 | 2/1979 | Walzer . |
| 4,150,497 | 4/1979 | Weber . |
| 4,343,610 | 8/1982 | Chou . |
| 4,345,817 | 8/1982 | Gwynn . |
| 4,383,827 | 5/1983 | Foerst . |
| 4,473,141 | 9/1984 | Mochida .............. 74/475 X |
| 4,507,736 | 3/1985 | Klatt .............. 74/475 X |
| 4,631,679 | 12/1986 | Klatt .............. 74/475 X |
| 4,750,888 | 6/1988 | Allard et al. . |
| 4,817,948 | 4/1989 | Simonelli .............. 434/71 X |
| 4,820,162 | 4/1989 | Ross . |
| 4,849,888 | 7/1989 | Seto .............. 364/424.1 |
| 4,856,360 | 8/1989 | Yoshimura et al. .............. 364/424.1 |
| 4,861,269 | 8/1989 | Meenen, Jr. . |
| 4,886,151 | 12/1989 | Muller et al. .............. 192/3.63 X |
| 4,947,967 | 8/1990 | Kito et al. .............. 74/483 R X |
| 4,949,119 | 8/1990 | Moncrief et al. .............. 364/578 |
| 4,960,117 | 10/1990 | Moncrief et al. . |
| 5,035,113 | 7/1991 | Simonyi et al. .............. 74/473 R X |

FOREIGN PATENT DOCUMENTS

| | | |
|---|---|---|
| 3301704 | 7/1984 | Fed. Rep. of Germany . |
| 3301880 | 9/1984 | Fed. Rep. of Germany . |
| 2491660 | 4/1982 | France . |
| 2557337 | 6/1985 | France . |
| 2036404 | 6/1980 | United Kingdom . |

OTHER PUBLICATIONS

E. Donges, "The Automobile Driving Simulator for Anthropogenic Research", Forschungsinstituts Fur Anthropotechnik, No. FB-41, Jul. 1978.

(List continued on next page.)

Primary Examiner—Parshotam S. Lall
Assistant Examiner—Edward J. Pipala
Attorney, Agent, or Firm—Knobbe, Martens, Olson & Bear

[57] ABSTRACT

An apparatus for creating a realistic feel for a simulated gearshift includes a simulated gearshift for a simulated transmission in a simulated vehicle and has a gearshift lever and a simulated shift pattern for simulating the look and movements through an actual shift pattern of an actual gearshift in a actual vehicle. A pivoting mechanical coupling couples the gearshift lever to a housing for allowing the gearshift lever to pivot about at least two axes. A solenoid is coupled to the pivoting mechanism and has a control signal input for receiving a control signal that controls the amount of force applied to the pivoting mechanism to cause resistance to movement by the shift lever along at least one of the axes. A control computer generates to apply an amount of force to the pivoting mechanical coupling which simulates the actual forces which would be felt by said operator in making the corresponding movement of the gearshift in an actual vehicle.

20 Claims, 8 Drawing Sheets

OTHER PUBLICATIONS

McFadden Systems, Inc., "McFadden Newsletter", vol. 6, No. 1, Aug. 1987.

"Pilot Trainees Take Off with a Flight Simulator", InfoWorld, Sep. 9, 1985, p. 54.

"Image Processing Advances Flight Simulator", Defense Electronics, Aug. 1983, p. 37.

"Designers of Aircraft Turning to new Analytical Tools", Aviation Week & Space Technology, Jan. 17, 1983, pp. 42–43.

David J. Bak, "Low-Cost Flight Simulator Checks Design Concepts", Design News, Sep. 7, 1987, pp. 176–177.

David J. Bak, "Math Models Replace Hardware in German Automobile Simulator", Design News, Oct. 5, 1987, pp. 154–155.

"Machine Design", Nov. 11, 1976, p. 38.

"Design Engineering", Mar. 1980, p. 7.

"Daimler-Benz Unveils Driving Simulator", Ward's Automotive Reports, Jun. 3, 1985, p. 171.

Bouju, M. FR 2,491,660 Apr. 9, 1982, Abstract.

Geiger, H. DE 3,301,880 Sep. 13, 1984 JP 59,141,975 Aug. 14, 1984, Abstract.

Goulmy, J. R. G., FR 2,557,337, Jun. 28, 1985, Abstract.

GEARSHIFT FOR A VEHICLE SIMULATOR HAVING A SOLENOID FOR IMPOSING A RESISTANCE FORCE

This application is a continuation of application Ser. No. 07/561,086 filed Aug. 1, 1990, now abandoned.

BACKGROUND OF THE INVENTION

1. Field of the Invention

The invention pertains to the field of vehicle simulators, and, more particularly, to the emulation of the look and feel of real world control devices for vehicles. In particular, the invention simulates the forces felt by the operator in manipulating the gearshift of a car with a manual transmission using a simulated car and a simulated gearshift which are computer controlled to emulate the real world forces which would be felt if an actual vehicle were manipulated in a similar fashion to the manipulation of the simulated vehicle using the simulated control device.

2. Description of the Related Art

Vehicle simulators have been known for a long time. In particular, aircraft simulators have long been known for use in training pilots. Such flight simulators are typified by U.S. Pat. No. 4,343,610 to Ghou and U.S. Pat. No. 4,345,817 to Gwynn. These two patents disclose, respectively, a motion system for providing motion of the simulator in three degrees of freedom and apparatus to widen the field of view of the pilot.

Various driving simulators are also known such as that disclosed in U.S. Pat. No. 2,806,430 to Bouju. This driving simulator employs mechanisms to vibrate the driving seat and cabin to simulate engine vibration and to provide resistance to pedal actuation and steering. This provides more realistic feedback to the driver of the simulator. A vehicle simulator which has various control devices for manipulation by the driver such as an acceleration pedal, brake pedal, clutch pedal, gear change lever and steering wheel is taught in U.S. Pat. No. 4,383,827 to Foerst. This vehicle simulator uses a digital computer to provide a road vehicle driving simulation wherein the road simulation is shown on a video display and is fully interactive with control inputs from the control devices manipulated by the driver. A driving simulator with feedback forces to a steering wheel is taught in "The Automobile Driving Simulator For Anthropogenic Research" by E. Donges, published as report No. FB-41 in Forschungsinstitut Fuer Anthropotechnik in July 1978. A vehicle simulator by McFadden Systems, Inc. of Santa Fe Springs, Calif., includes a steering control torque to be programmed into the steering wheel loader. The system consists of a DC servo unit, torque cell, servo controller, power amplifier and cables. The torque cell provides feedback for a torque servo. The servo controller/power amplifier unit contains electronic servo compensation and power amplification to drive the DC torque motor. Spring gradient variations can be made in real time via host computer commands. This steering wheel loader has been installed in the driving simulator of a major automotive manufacturer to evaluate drive/vehicle performance over a wide variety of road conditions.

A vehicle simulating arcade game produced by Atari Games, Inc. of Milpitas, Calif. and marketed under the name "Hard Drivin'" ™ incorporates systems for simulating feedback forces to automobile components such as steering wheels, brakes and clutches. This device includes a gearshift device for simulating the look and feel of an actual gearshift lever with a computer driven electrically operated clutch to resist movement of the gearshift lever as appropriate to the specific situation. One embodiment of such a device for simulating the look and feel of a gearshift lever in a manual transmission is disclosed in U.S. patent application Ser. No. 296,552 to Moncrief, et al., filed Jan. 12, 1989, now U.S. Pat. No. 4,949,119 and entitled "Gearshift for a Vehicle Simulator Using Computer Controlled Realistic Real World Forces," for which the base issue fee has been paid. This reference is hereby incorporated herein by reference.

The realistic simulation of forces experienced in the gearshift system of the "Hard Drivin'" ™ product, and described in the Moncrief, et al., patent application, is produced as a result of relatively involved interplay between complex hardware, firmware and software. Although the output produced is very good, the initial system cost is a concern. Thus, a need has arisen for a gearshift emulation system which can simulate under very realistic conditions those forces felt by the operator of a manual transmission shift lever in an actual vehicle, while being simple and relatively inexpensive in construction and reliable in operation over extended periods. Such a device has applications in games as well as in vehicle simulators.

SUMMARY OF THE INVENTION

There is disclosed herein an apparatus and a method for emulating the look and feel of an actual manual transmission in a real vehicle through the use of a simulated gearshift lever having both mechanical and electro-mechanical components for producing selected forces on the gearshift, position sensors, and a computer coupled to all of the above. The computer senses the position of the gearshift in a gearshift pattern. The computer also receives data from any other external source such as another computer in a simulator. This data indicates the amount of torque being applied to the simulated gears of the simulated transmission to which the simulated gearshift lever is hypothetically coupled. The position of the clutch is also received by the computer. The computer then makes a judgment based upon all these conditions regarding whether or not an operator should be allowed to move the gearshift lever based upon whether such a movement would be permitted in an actual transmission under similar circumstances. The decision as to whether or not to allow the operator to move the gearshift lever is based upon the relative slip ratio of the gears to be engaged (in some embodiments), the torque passing through the simulated transmission, and upon several other factors. If it is decided that the operator should not be allowed to place the simulated transmission into a simulated gear, a solenoid is driven by the computer so as to impose a securing force on a pivoting mechanism through which the simulated gearshift lever pivots. This force is applied in such a manner as to disallow movement of the gearshift lever from the present gear position (i.e. first, second, neutral, etc.). In addition, in one embodiment, the computer may also impose a force that restrains but does not prevent movement between gear positions in circumstances where resistive force would slow movement in an actual transmission.

If the operator of the simulated transmission ha the simulated transmission engaged in a particular gear the computer senses this through the position sensors. The computer then examines the torque data received from the outside source indicating how much torque is being applied through the transmission. If the torque level is too high, the computer will activate the solenoid, thereby preventing the operator from pulling the simulated transmission gearshift lever out of gear by driving the solenoid to apply sufficient force to the pivotal mechanism to disallow movement of the simulated gearshift lever. This action is based on the fact that for an actual manual transmission under the same conditions of high torque, the transmission could not be disengaged from the gear currently being used. However, in the absence of such high torque, the computer will not activate the solenoid, thus permitting the user to disengage the transmission from gear, via the gearshift, if the operator so desires.

Many manual transmissions in actual vehicles have what are called synchronization gates. When the gearshift lever of an actual transmission is moved into gear or out of gear, a "synchro gate" must be passed. The synchro gate causes the two gears to be engaged in the actual transmission to be brought to approximately the same angular velocity such that the gears can be engaged quietly and smoothly. When an actual transmission shift lever is moved through such a synchro gate, a small increase in force is felt through the gearshift lever as the synchro gate performs its function. Also, a slight increase in drag on the gearshift lever of an actual transmission occurs when the gearshift lever is moved to pull the transmission out of gear and into neutral. The gearshift simulator of the invention simulates these small increases in force by providing a rotatable arm that is connected to the gearshift lever and is spring biased against detents in an adjacent plate, to create a small resistance to gearshift movement when the gearshift lever is at the position where a synchronization gate would normally be felt in the simulated shift pattern and to increase the resistive force applied to the pivotal mechanism somewhat so as to impede but not stop the gearshift lever as it moves through the synchro gate thereby emulating the feel of a synchro gate in an actual transmission.

DETAILED DESCRIPTION OF THE PREFERRED EMBODIMENT

Figure 1:
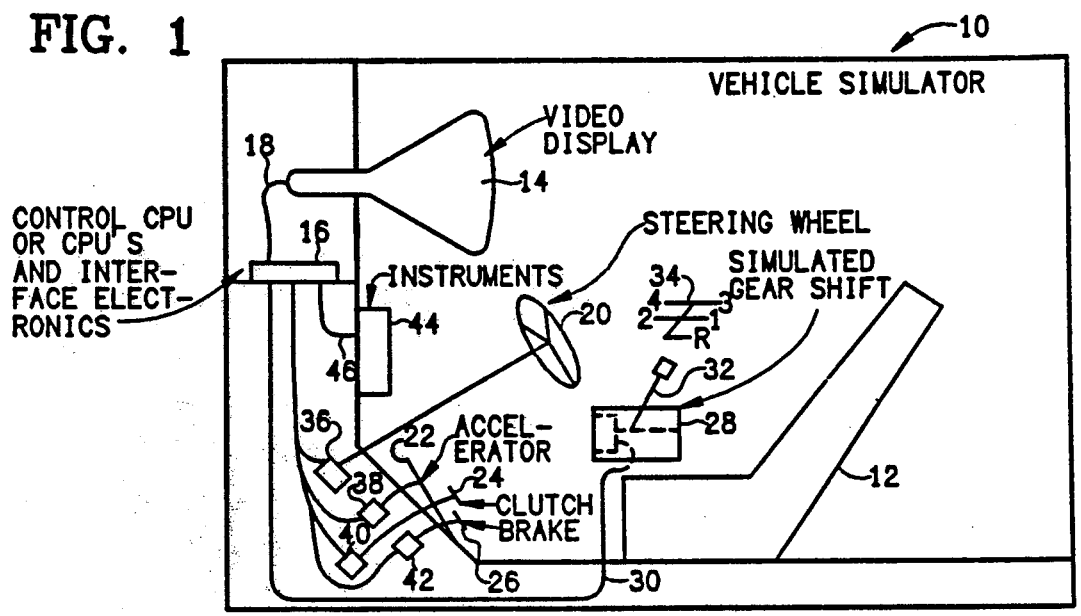
FIG. 1 is a schematic diagram of a typical vehicle simulator or game in which the invention may be used.

Referring to FIG. 1, there is shown a typical vehicle simulator environment in which the teachings of the present invention may be carried out. A vehicle simulator 10 comprises a seat 12 for the operator and a video display 14 through which the operating environment is displayed. The video display 14 is driven by a control unit of the driver electronics 16. The driver electronics 16 may comprise one or more CPU's or microprocessors and other interface electronics. The driver electronics 16 is coupled to the video display 14 by a cable 18. The operator of the simulator (not shown) is seated before various vehicle control devices such as a steering wheel 20, an accelerator pedal 22, a clutch pedal 24 and a brake pedal 26. The driver may also manipulate a simulated gearshift 28 having a simulated gearshift lever 32 and which implements the teachings of the method and apparatus of the invention disclosed herein. The purpose of the gearshift 28 is to emulate the look and feel of an actual gearshift for a manual transmission in an actual vehicle. The control CPU or CPU's and interface electronics (hereinafter collectively referred to as the control unit 16) is coupled to the simulated gearshift 28 by a cable 30.

Each of the steering wheel 20, the accelerator 22, the clutch 24 and the brake 26 has transducers coupled thereto to sense movement or pressure on the control device in question and, in some cases, to provide tactile feedback to the driver in accordance with the actual forces which would be felt by the driver in manipulating the corresponding control device in an actual vehicle under conditions similar to those currently being simulated in the vehicle simulator 10. The simulated gearshift 28 also has one or more transducers (not shown) which provide feedback to the operator manipulating the simulated gearshift lever 32 and for sensing the position of the simulated gearshift lever 32 in a gearshift pattern 34 (shown symbolically) and described in more detail in conjunction with the discussion of FIG. 3. Of course, the illustrated gearshift pattern 34 is one of several patterns commonly used in standard, or manual, transmission vehicles. The particular pattern shown and described herein is used for illustrative purposes only, since the system is equally applicable to any of the gearshift patterns used on such standard transmissions.

A transducer 36 for the steering wheel 20 is provided to sense the turning or lack thereof of the steering wheel 20 by the driver. A transducer 38 is coupled to the accelerator 22 to sense the amount of power the driver wishes to apply to a simulated transmission (not shown) from a simulated engine (not shown). A transducer 40 is coupled to the clutch 24 to sense when the clutch is depressed. A transducer 42 is coupled to the brake 26 to sense when the brake is depressed.

The control unit 16 senses all the command inputs from the driver through the various vehicle control devices described above and computes the position, speed and direction of travel of the simulated vehicle in a simulated universe. The speed of travel, engine RPM, fuel and other typical information is displayed to the driver through a simulated instrument panel which can be either a stand alone unit 44 or displayed instruments having displayed readings on the video display 14. The instruments 44 are coupled to the control unit 16 by a cable 46.

One of the functions of tee control unit 16 is to cause the simulated gearshift 28, through the simulated gearshift lever 32, to feel like an actual gearshift lever in a manual transmission when that manual transmission is subjected to similar conditions to those being simulated. To do this, the control unit 16 requires certain information regarding the position of the gearshift lever 32 in the gearshift pattern 34, and a means by which a microprocessor or a computer in the control unit 16 may cause resistance to movement of the simulated gearshift lever 32.

There will next be described the mechanical configuration of one embodiment of a simulated gearshift lever mechanism which may be used to emulate the look and feel of an actual gearshift lever for a manual transmission in an actual vehicle. This mechanical configuration includes transducers to provide information to the control unit 16 to carry out commands from the control unit 16 to cause the appropriate resistance to movement by the shift lever 32.

Figure 2:
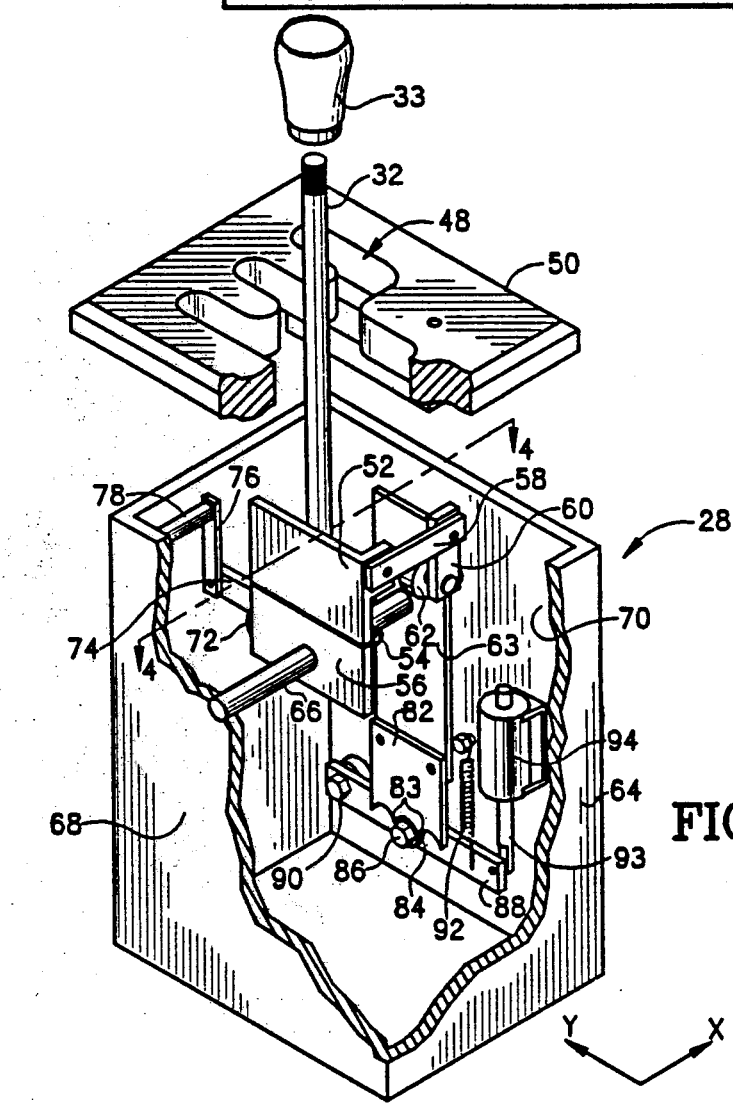
FIG. 2 is a cutaway perspective view of one presently preferred embodiment of the simulated gearshift lever and pivotal mechanism.
Figure 3:
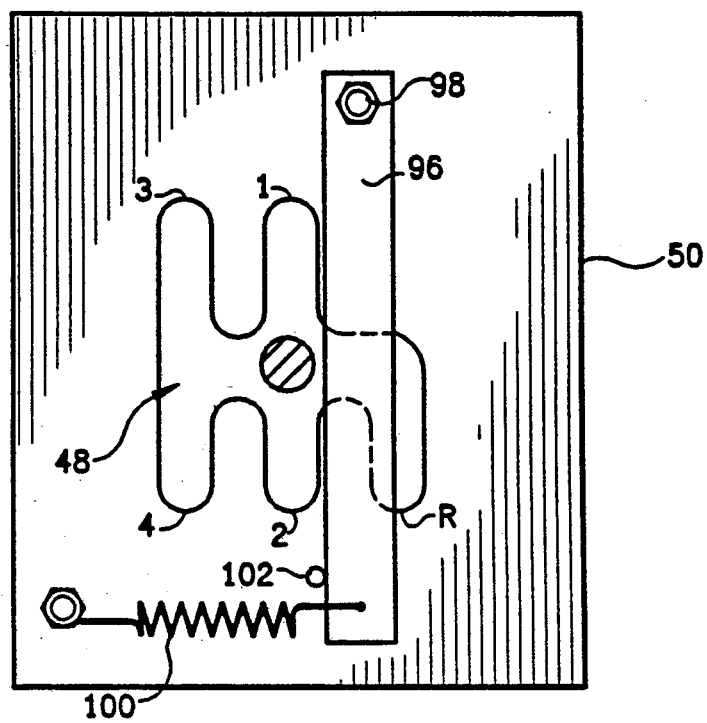
FIG. 3 is a bottom plan view of a presently preferred embodiment of a gearshift gate for defining the gearshift pattern in the device of FIG. 2.
Figure 4:
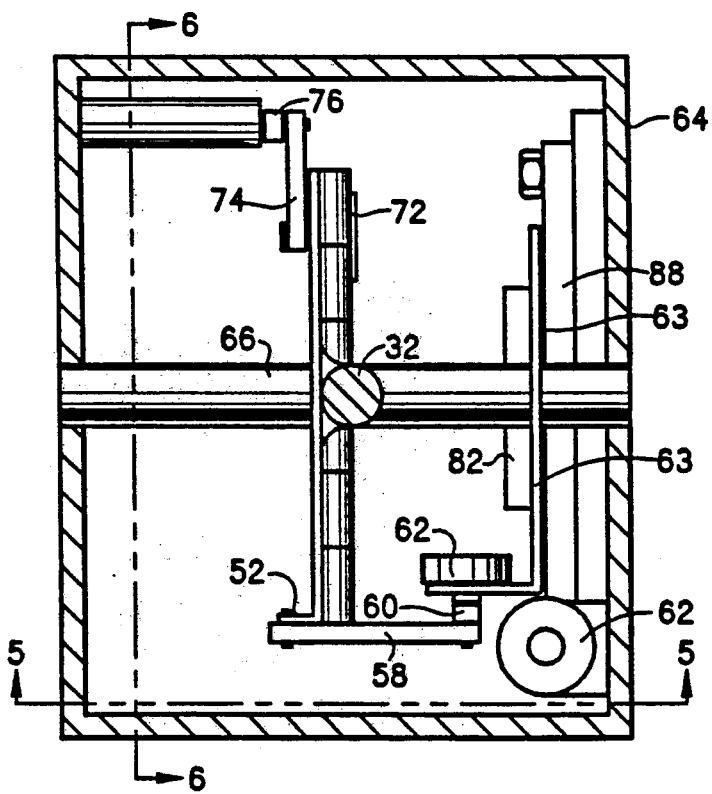
FIG. 4 is a top cross sectional view of the device of FIG. 2, taken along the line marked 4—4 in FIG. 2.
Figure 5:
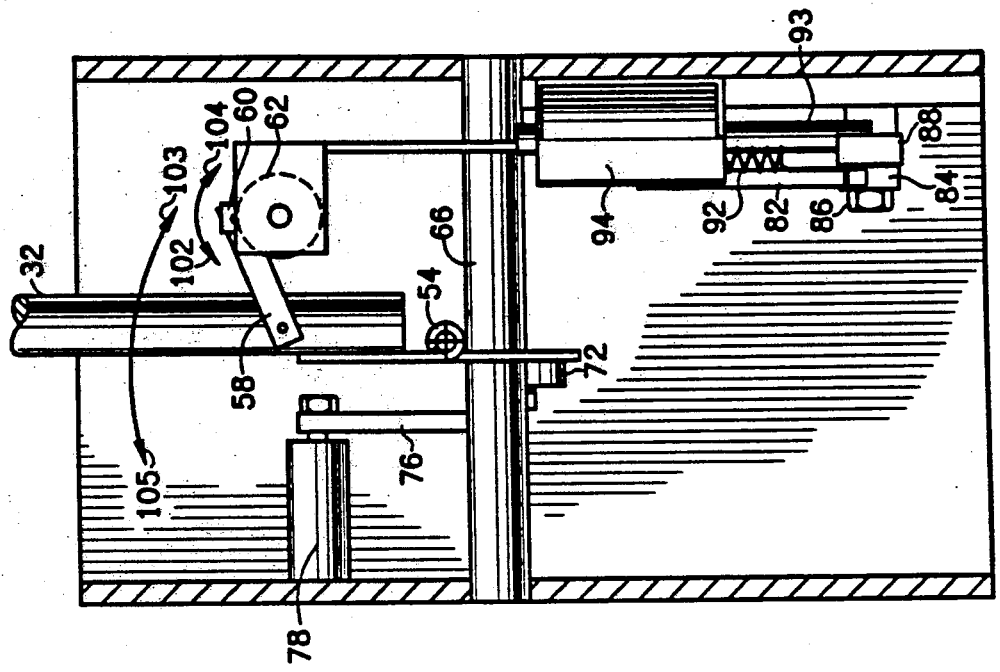
FIG. 5 is a cross sectional view through the device of FIG. 2 taken along the section line marked 5—5 in FIG. 4.
Figure 6:
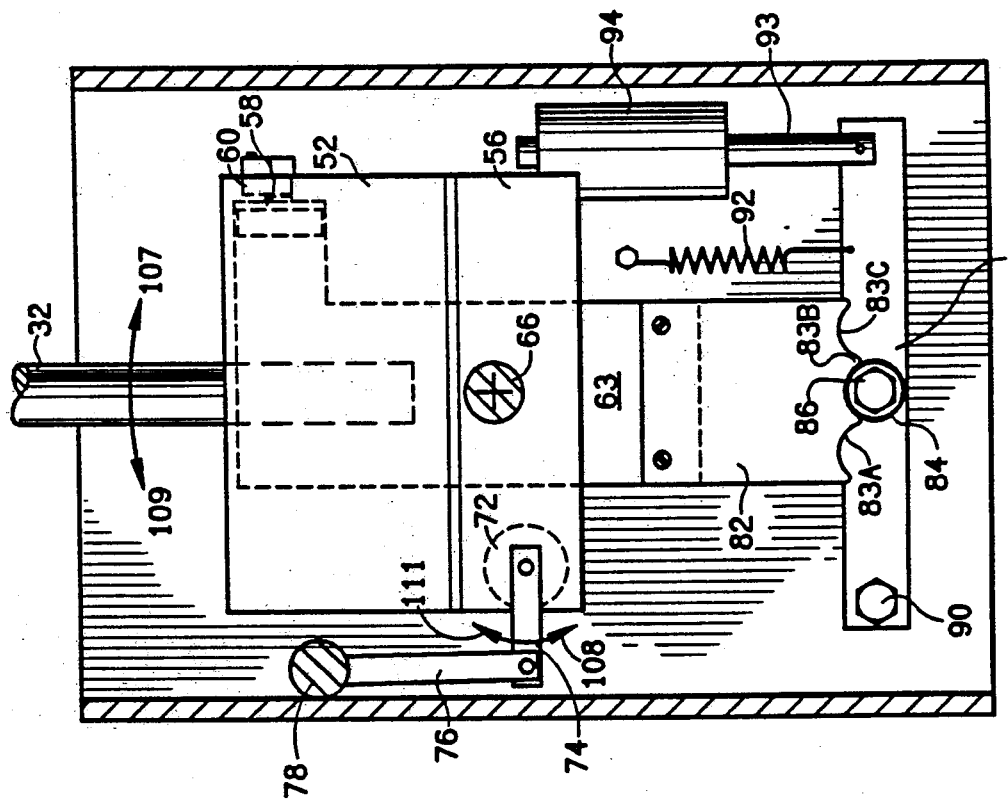
FIG. 6 is a cross sectional view of the device of FIG. 4 taken along the section line marked 6—6 in FIG. 4.

One preferred embodiment of a mechanical configuration for a simulated gearshift which may be used to implement the teachings of the invention is illustrated in FIGS. 2-6. FIG. 2 shows a cutaway perspective view of the simulated gearshift 28. FIG. 3 shows a bottom view of a preferred embodiment of a gearshift gate 50 indicated in FIG. 2. FIGS. 4, 5 and 6 are sectional views of the simulated gearshift 28 taken through the section lines marked with corresponding figure numbers as shown in FIGS. 2 and 4. Like numbered elements in FIGS. 2 through 6 represent the same mechanical element throughout these figures.

Referring first to FIG. 2, the shift lever 32 is mechanically affixed at a top end to a hand grip 33. From the hand grip 33, the shift lever 32 extends downward through a gearshift pattern slot 48 in a plate defining the gearshift gate 50, to a connection with a first support plate 52. The first support plate 52 is constructed of material such as metal to provide support to the shift lever 32 during shifting operations. The shift lever 32 is preferably rigidly affixed to the central portion of one face of the support plate 52 by means such as soldering or welding.

The lower edge of the first support plate 52 is connected via a rotatable member, such as a hinge 54, to the upper edge of a second support plate 56 that is constructed of material similar to that of the first support plate 52. The second support plate 56 is mechanically secured to a shaft 66 that is rotatably connected between opposite walls 68 and 70 of a housing 64 so as to rotate about the X axis. In this configuration, movement of the gearshift lever 32 in the X direction within the gearshift pattern slot 48 causes rotation of the first support plate 52 about the hinge 54, which lies along the Y axis. As the gearshift lever 32 is moved in the Y direction within the gearshift pattern slot 48, the second support plate 56 is caused to rotate about the shaft 66, which lies along the X axis.

The upper portion of the first support plate 52 is connected to one end of a first arm 58 so that the first arm 58 also rotates about the hinge 54. The other end of the first arm 58 is connected to one end of a second arm 60 so that the second arm 60 also rotates about the hinge 54. The other end of the second arm 60 is connected to the rotatable shaft of an angular position sensor such as a potentiometer 62 that is affixed to a face of a control plate 63 preferably constructed of material corresponding to the support plates 52 and 56. The control plate 63 is mechanically secured to the shaft 66 so as to rotate about that shaft as the shaft 66 moves.

The position of the first support plate 52 with respect to the hinge 54 corresponds with that of the gearshift lever 32. This position is communicated via the arms 58 and 60 to the potentiometer 62, which thereby produces a signal indicating the position of the gearshift lever with respect to the X axis in the gearshift pattern slot 48. This position information is electrically communicated from the potentiometer 62 to the control unit 16 for use in system control.

The position of the gearshift lever 32 with respect to the Y axis in the gearshift pattern slot 48 is detected by a potentiometer 72 (best illustrated in FIG. 5) secured to a face of the second support plate 56. The potentiometer 72 is secured via its axis to one end of a third arm 74 which has its other end rotatably connected to one end of a fourth arm 76. The other end of the fourth arm 76 is rotatably connected to a pivot location on a member 78 that is secured in stationary position with respect to the housing wall 68. In this manner, movement of the gearshift lever 32 in the Y direction within the shift pattern 34 will cause rotation of the axis of the potentiometer 72, thereby providing a signal from the potentiometer 72 indicating the Y axis position of the gearshift lever 3. This position information is electrically communicated from the potentiometer 72 to the control unit 16 for use in system control.

The control plate 63 extends downward from its connection with the shaft 66 to provide a base for a detent plate 82 that is connected thereto. The detent plate 82 includes a set of several semicircular detents 83A, 83B and 83C (see FIG. 6) in its lower edge for use in the simulation of "synchro gate" operation, as described in detail below. The detent plate 82 is preferably constructed of material such as plastic to provide strength while accommodating impact of the detents 83 with an adjacent collar 84 of similar material.

The collar 84 is secured so as to rotate about the axis of a securing member such as a machine bolt 86 that is secured to a pivot arm 88. The pivot arm 88 is rotatably secured at one end about the shaft of a securing member such as a machine bolt 90 that is affixed to the housing wall 70. The collar 84 is located on the pivot arm 88 so as to align with and be received in mating configuration within one of the detents 83. Preferably, in a conventional four speed manual transmission, for example, there will be 3 detents 83 on the end of the detent plate 84. In this case, the collar 84 preferably is received within the center detent 83B when the gearshift lever 32 is in the neutral position.

The collar 84 is maintained within one of the detents 83 by a bias force applied to the pivot arm 88. In the illustrated embodiment, this bias force is provided by a spring 92 that is affixed at one end to the housing wall 70, and at its other end to a portion of the pivot arm 88 at a location and in a relationship to apply the desired bias force on the pivot arm 88 and from there to the collar 84.

The amount of bias force applied to the collar 84 is that necessary to simulate the forces produced by the synchro gate on the gearshift lever of the automobile to be simulated (not shown) when the gearshift lever is moving between gear positions during shifting operations. In particular, the spring 92 pulls upwardly on the pivot arm 88 to seat the collar 84 within the adjacent detent 83. As the operator attempts to push the gearshift lever 32 in the direction of the Y axis into a new gear position (i.e. from neutral into one of the gears or vice versa), the control plate 63 and detent plate 82 will rotate about the shaft 66, causing the lower edge of the detent plate 82 to move. The bias force applied by the spring 92 via the collar 84 within the detent 83 will resist movement of the detent plate 82, and this resistance will be mechanically communicated to the operator through the gearshift lever 32.

As the operator (not shown) applies sufficient force, the bias force applied by the spring 92 to the pivot arm 88 is overcome, and the pivot arm 88 will move downwardly away from the lower edge of the detent plate 82 as the collar 84 rolls along the profile of the adjacent detent 83. Once the collar 84 has passed the apex of the lower edge of the detent plate 82, between adjacent detents 83, the spring bias force coupled with the force provided by the operator on the gearshift lever 32 will seat the collar 84 in the new detent 83 and, correspondingly, bring the gearshift lever 32 into the new gear position within the gearshift pattern slot 48. With proper selection of the configuration of the detents 83 in the lower edge of the detent plate 82, and with proper selection of the force applied by the spring 92, the above described relationship between the collar 84 and detents 83 during shifting operations can very closely simulate synchro gate operation in gear shifting operations in an actual vehicle.

As with actual vehicle operation, shifting between gear positions is permitted during appropriate conditions such as when the clutch pedal is pushed to the floor and the synchro gates are properly aligned, or even when the clutch is not depressed, but the torque applied to the transmission is such that transition between gear positions is permissible. However, under circumstances where the synchro gates are not properly aligned or when too much torque is being applied to the transmission, the gear position cannot be changed. This condition is also simulated in the simulated gearshift 28 of the present invention.

To provide for simulation of conditions when gear shifting is not permitted, a portion of the pivot arm 88 is rotatably connected to a piston 93 of a solenoid 94. The solenoid 94 is anchored to the housing wall 70 to maintain its fixed position with respect to the pivot arm 88. The solenoid 94 is also electrically connected to the control unit 16, (FIG. 1) to thereby receive control signals that activate or deactivate the solenoid 94.

During conditions in which gear shifting is permissible, the control unit 16 will maintain the solenoid 64 in the off or deactivated condition, thereby permitting movement of the gearshift lever 32 between gear positions. However, when the control unit 16 determines that conditions are such that gear shifting will not be permitted, it will send a signal turning on or activating the solenoid 94.

Under conditions when gear shifting is permitted only due to gear synchronization, the control unit 16 will apply a pulsed signal to the solenoid 94 so that a resistive force is emulated. In the condition when no shifting is permitted, the solenoid 94 will secure its piston 93 in a position that fixes the position of the pivot arm 88, thereby maintaining the collar 84 in seated configuration within one of the detents 83. With the solenoid on, the operator should not be able to apply force to the gearshift lever 32 sufficient to change the gear position. When gear shifting is allowed due to synchronization, the operator may overcome the resistive force of the solenoid 94 so as to enter or exit a gear. The procedure used by the control unit 16 in determining whether to allow shifting of gears is more fully explained hereinafter.

Referring now to FIG. 3, it is possible to more fully describe the operation of the gearshift gate 50. In particular, the gearshift gate 50 comprises a material such as metal or heavy duty plastic sufficient to withstand forces applied by an operator moving the gearshift lever 32 (FIG. 2) between gear positions. The pathways available to the operator (not shown) and defining permissible positions of the gearshift lever 32 are defined by the gearshift pattern slot 48.

During operation of actual automobiles, a resistive force is typically applied to the gearshift lever as the operator moves it in neutral position toward the reverse gear position. This is to help prevent inadvertent shifting of the vehicle into the reverse gear position. This condition is simulated in the present invention by use of a pivot arm 96 that is pivotally affixed to the shaft of a securing member, such as a machine bolt 98, which is secured to the inner face of the gearshift gate 50. The pivot arm 96 is positioned adjacent the inner face of the gearshift gate 50 so as to lie across a portion of the gearshift pattern slot 48 defining the neutral position between the entrance to the reverse position and the other gear positions.

The resistive force is applied to the pivot arm 96 by a bias spring 100 that is secured to the free end of the pivot arm 96, and extends to a connection with the inner face of the gearshift gate 50. A stop member 102, comprising a metal post, for example, is positioned in the inner face of the gearshift gate 50 so as to secure the pivot arm 96 in proper position against the force applied by the bias spring 100.

In operation, as the operator moves the gearshift lever 32 (FIG. 2) in the neutral position toward the reverse gear position, the gearshift lever 32 contacts the pivot arm 96, and the resistive force is communicated from the bias spring 100 through the pivot arm 96 to the gearshift lever 32. This resistive force simulates the resistive force encountered by the operator in shifting into the reverse gear position in an actual automobile shifting operation.

FIG. 4 provides a representation of one presently preferred configuration of the potentiometers 62 and 72 in the device of the present invention. In particular, it is noted that the potentiometer 72 is positioned on a face of the second support plate 56, and that the rotatable shaft of the potentiometer 72 extends through an aperture in the second support plate 56 to a connection with the third arm 74 and fourth arm 76 as was previously described. Of course, it is understood that the physical configuration of these potentiometers 62, 72, as well as other components in the simulated gearshift 28, could be arranged in numerous ways while still properly defining the apparatus and function of the present invention. For example, the potentiometer 72 could be positioned on the same side of the second support plate 56 as the third arm 74, or it could be secured to a wall of the housing 64 and connected via arm members to the second support plate 56, with proper operation achieved. Likewise, the potentiometer 62 could be positioned in mechanical connection with the control plate 63, as shown, or it could be positioned on the first support plate 52 and connected via arm members to the control plate 63.

FIG. 5 provides an understanding of the manner in which the position of the gearshift lever 32 is communicated to the potentiometer 62 for detection of the lever position in the X direction. In particular, as the gearshift lever 32 is moved in the direction indicated by an arrow 103, the first arm 58 and second arm 60 cause the axle of the potentiometer 62 to rotate in the direction indicated by an arrow 104. Likewise, when the gearshift lever is moved in the direction indicated by an arrow 105, the axle of the potentiometer 62 is caused to rotate in the direction indicated by an arrow 102.

FIG. 6 provides an understanding of the manner in which the position of the gearshift lever 32 is communicated to the potentiometer 72 for detection of lever position in the Y direction. More specifically, as the gearshift lever 32 is moved in the direction indicated by an arrow 107, the third arm 74 and fourth arm 76 cause the axle of the potentiometer 72 to rotate in the direction indicated by an arrow 108. Likewise, when the gearshift lever is moved in the direction indicated by an arrow 109, the axle of the potentiometer 72 is caused to rotate in the direction indicated by an arrow 111.

Figure 7:
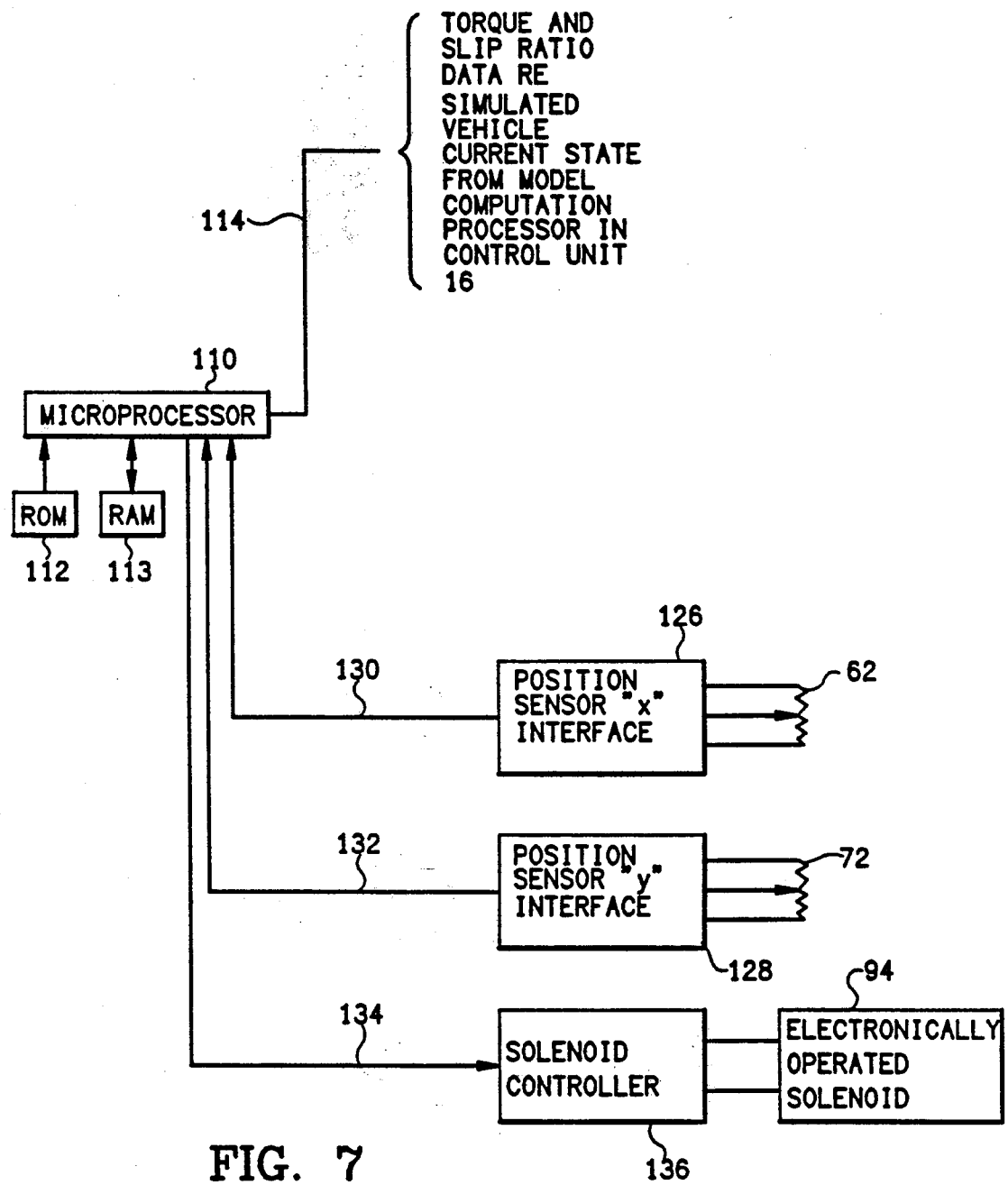
FIG. 7 is a block diagram of the electronics of the apparatus of the invention.

Referring to FIG. 7, there is shown an electronic block diagram of the electronic apparatus forming part of the invention. A microprocessor 110 runs a program stored in a read-only memory (ROM) 112 in order to sense certain conditions at the gearshift, receive data regarding conditions in the simulated vehicle, and control the solenoid 94 according to this data to simulate real world forces. The microprocessor 110 uses a random access memory (RAM) 113 in performing its functions. The microprocessor 110 may also be a mainframe computer or minicomputer, but microprocessors are preferred since they are cheaper and smaller.

The microprocessor 110 receives torque and slip ratio data defining the status of the simulated vehicle and its simulated transmission on a bus 114. This data comes from a model computation processor (not shown) in the control unit 16, such processors being known to those in the art.

The microprocessor 110 determines position of the simulated gearshift lever 32 (FIG. 2) with respect to the simulated shift pattern 34 through X and Y position sensors 62 and 72, respectively, from data produced in the manner indicated above. These X and Y position sensors 62 and 72 are potentiometers in the preferred embodiment, and are coupled to the microprocessor 110 through interface circuits 126 and 128, respectively. The position sensor interface 126 is coupled to the microprocessor 110 by a bus 130. The position sensor interface 128 is coupled to the microprocessor 110 by a bus 132.

The microprocessor 110 uses the data gathered from the position sensors 62 and 72, and a clutch position sensor (not shown), along with the torque and slip ratio data received from the model computation processor in the control unit 16 via the bus 114 to evaluate whether the solenoid 94 is to be turned on or off in order to properly simulate gearshift operation. The details of this processing by the microprocessor 110 will be set forth below in connection with the discussion of the flow diagrams. Basically, the microprocessor 110 determines where in the shift pattern the shift lever 32 is so as to be able to determine whether the simulated transmission is in a particular gear. The microprocessor 110 then obtains data representing the level of torque which is being applied to the gears in the transmission by the engine and the slip ratio between gears to be engaged if the gearshift lever 32 is in a position where the simulated transmission is not in gear.

All of these factors are combined to determine whether the slip ratio is too high to allow effective meshing or the clutch is not depressed or torque is being applied. In these situations, an actual transmission would not go into gear, and the microprocessor 110 sends a command on a bus 134 to cause a solenoid controller 136 to drive the solenoid 94 to prevent the simulated gearshift lever 32 from being moved further toward the position of the desired gear.

Likewise, for the case where the simulated transmission is in gear, the microprocessor 110 determines whether the torque level passing through the transmission is too high to permit the operator to pull the simulated transmission out of gear. If this situation is found to exist in the simulated transmission, the microprocessor 110 sends a command on the bus 134 to the solenoid controller 136 so as to prevent the simulated gearshift lever 32 from being moved to pull the simulated transmission out of gear.

In one embodiment, the microprocessor 110 also determines the slip ratio between the simulated gears in the simulated transmission from the data on the bus 114 received from the model computation processor (not shown) in the control unit 16. If the slip ratio indicates that the two gears to be engaged are going at sufficiently different speeds such that a synchro gate in an actual transmission would not permit the two gears to be engaged, the microprocessor 110 sends a command on the bus 134 to cause the solenoid controller 136 to drive the solenoid 94 so a to completely stop movement of the gearshift lever 32 such that the simulated transmission cannot be placed in the desired gear. One embodiment of the solenoid controller 136 comprises conventional electronics for receiving signals from a microprocessor and providing a control signal to drive the solenoid into a selected state of "on", "off" or 37 resist". A simple "on", "off" drive method using a FET or bipolar transistor can also be used.

Figure 8:
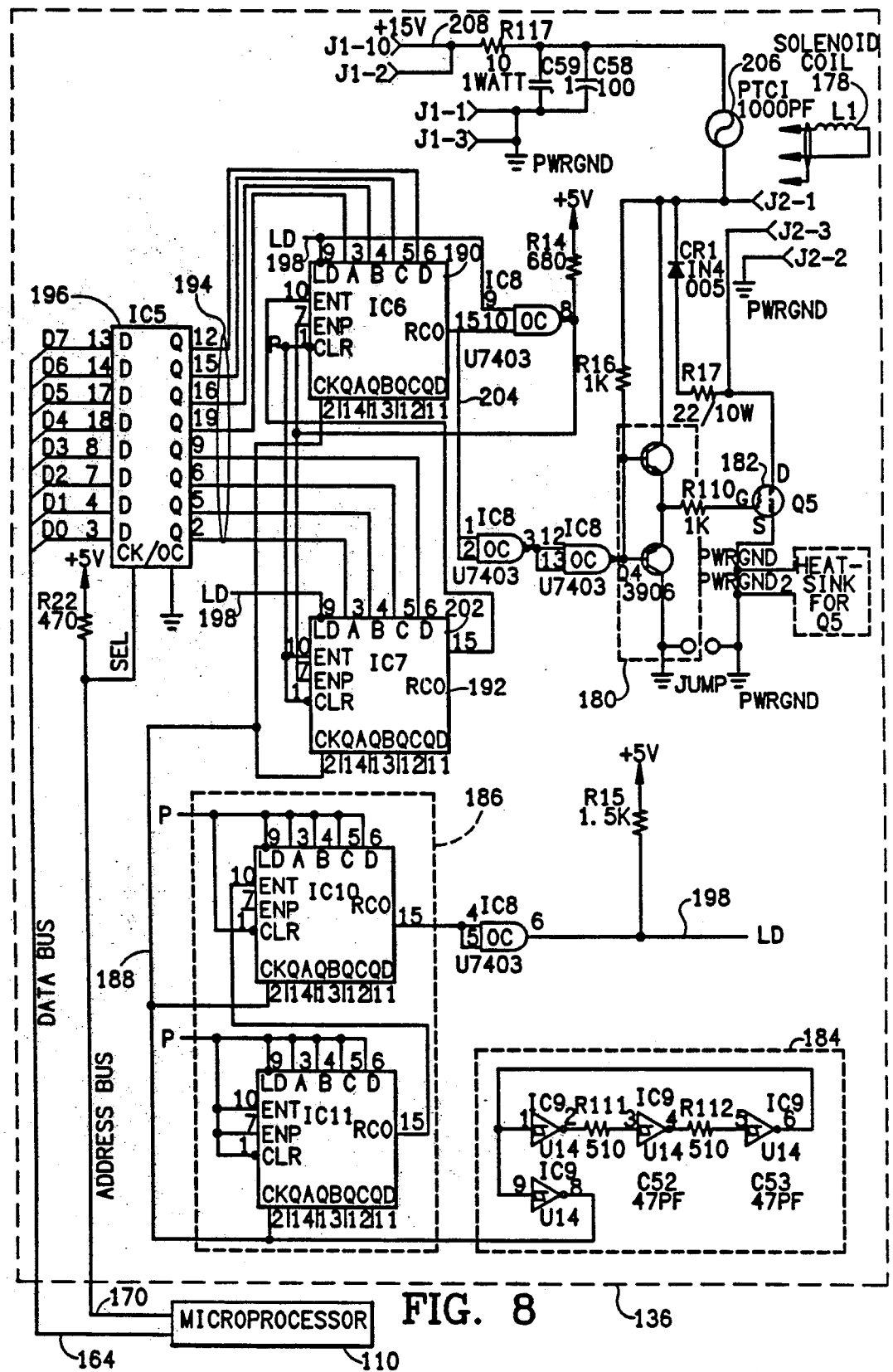
FIG. 8 is a circuit diagram of the solenoid controller shown in FIG. 7.

Referring to FIG. 8, the details of the solenoid controller 136 are shown. The solenoid controller 136 uses duty cycle or pulse width modulation (PWM) where the particular duty cycle or PWM "on-time" is defined by a digital word received from the microprocessor 110 on a data bus 164 which is part of the bus 134. A second part of the bus 134 is an address bus 170. The solenoid 94 includes an electromagnetic coil 178. The coil 178 is driven by a pair of push-pull NPN and PNP transistors 180 driving a power MOSFET 182.

A clock 184 provides the basic time base for the duty cycle control on a clock line 188. A frequency divider 186 divides the clock frequency to a lower frequency to provide a load signal LD on a line 198. The base clock frequency on the line 188 is counted by a pair of counters 190 and 192. These counters may be preloaded with terminal counts via data on a bus 194 when the load signal LD on the line 198 is active. The data on the bus 194 sets the duty cycle.

The duty cycle is set by loading a digital number representing any decimal number between 0 and 255 (00H-FFH in hexadecimal) into a latch 196 whose outputs comprise the bus 194. The loading of the latch 196 is accomplished by the microprocessor 110 by selecting the latch 196 via a SEL signal line which is part of the address bus 170. The latch 196 is enabled and loaded by placing the appropriate data on the data bus 164 to define the duty cycle desired and then raising either the SEL signal line. This enables the +5 volt supply voltage to raise a clock input of the latch 196 to a logic 1 level, thereby loading the data on the data bus 164 into the latch 196. This data is then presented on the output bus 194 and loaded by the counters 192 and 190 when the load signal LD on the line 198 is activated on the output of the frequency divider 186. The clock on the line 188 is applied to the clock inputs of the two counters 190 and 192 and is counted by the counters 190 and 192.

The counters 190 and 192 are synchronous binary counters. The ripple carry output on a line 202 from the counter 192 is applied to the enable input of the counter 190, thereby enabling the counter 190 to count once each time the counter 202 reaches its terminal count. The counters 190 and 192 count up from the initial count loaded by the duty cycle data on the bus 194. The ripple carry output on a line 204 from the counter 190 is the drive signal for the push-pull transistors 180. When the ripple carry output occurs, the counters 190 and 192 stop counting until the next active load signal LD on the line 198, and the ripple carry output remains active until the counters resume counting.

The duty cycle data on the bus 194 determines the amount of time that the signal on the line 204 is in a logic 1 state versus a logic 0 state. This "on-time" versus "off-time" is the pulse width modulation or duty cycle which controls the amount of time the solenoid coil 178 is being actively driven with current by the power MOSFET 182. The higher the duty cycle, the more the solenoid coil 178 is in the "on" state. This translates to greater frictional force resisting movement of the simulated gearshift lever 32 (FIG. 2).

The solenoid coil 178 is protected by a resettable fuse 206. In the preferred embodiment, the fuse 206 is a PCT1 1000 PF model manufactured by Midwest Components. Basically, the fuse 206 is a collection of carbon particles suspended in an emulsion which heats up when current is driven through it. When the heat builds to a sufficient level, the emulsion expands thereby separating the carbon particles and opening the circuit. The resettable fuse 206 is needed because the solenoid 94 is designed for continuous operation at 12 volts, but it is being driven by a 20 volt source through the power MOSFET 182. The higher driving voltage is used such that the amount of force applied by the solenoid 94 can be rapidly increased despite the fact that inductors have a lagged response to rapid changes in current therethrough. It is desirable to be able to implement very sudden increases in force to get a good simulation of actual transmission. By driving the solenoid coil 178 with more voltage that it is designed for, the di/dt transient response time of the solenoid coil 178 can be lowered to get rapid increases in current through the solenoid coil 178, and therefore rapid increases in force applied to the gearshift lever 32 (FIG. 2). Because of this fact, there is an upper limit on the duty cycle to prevent burning out the solenoid coil 178. As a backup safety mechanism, the resettable fuse 206 is used such that if power is applied to the solenoid coil 178 for a time which exceeds a maximum allowable time, heating in the resettable fuse 206 causes the fuse to interrupt the current path from the 20 volt supply 208 through the solenoid coil 178.

To simulate the feel of a synchro gate in a real transmission, the duty cycle is increased as the shift lever 32 is moved across the position of the gate in certain circumstances when the microprocessor 110 determines that the transmission should be allowed to enter a particular simulated gear.

Figure 9A:
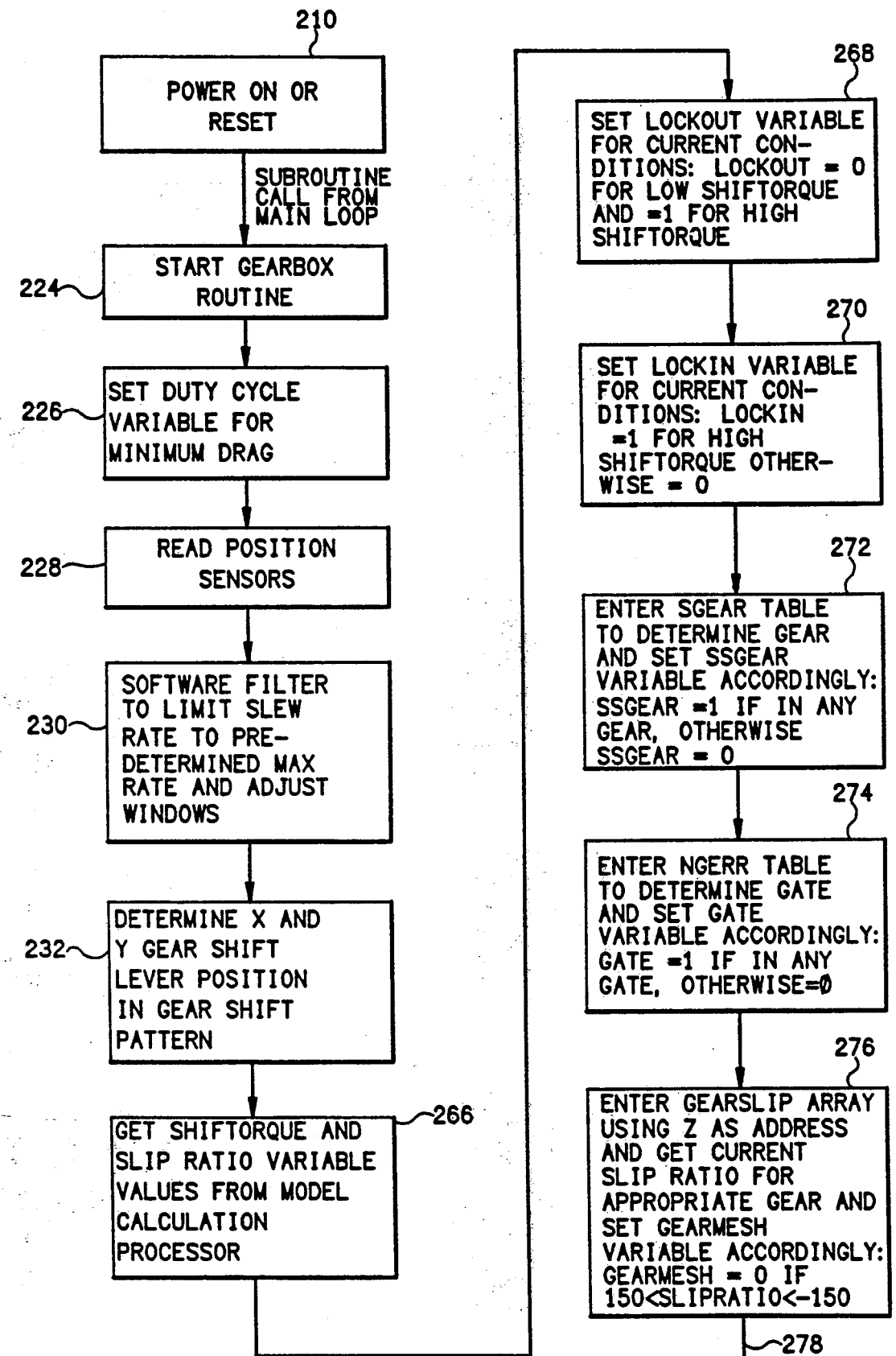
FIGS. 9A and 9B comprise a flow diagram of the software which controls the solenoid of the present invention.
Figure 9B:
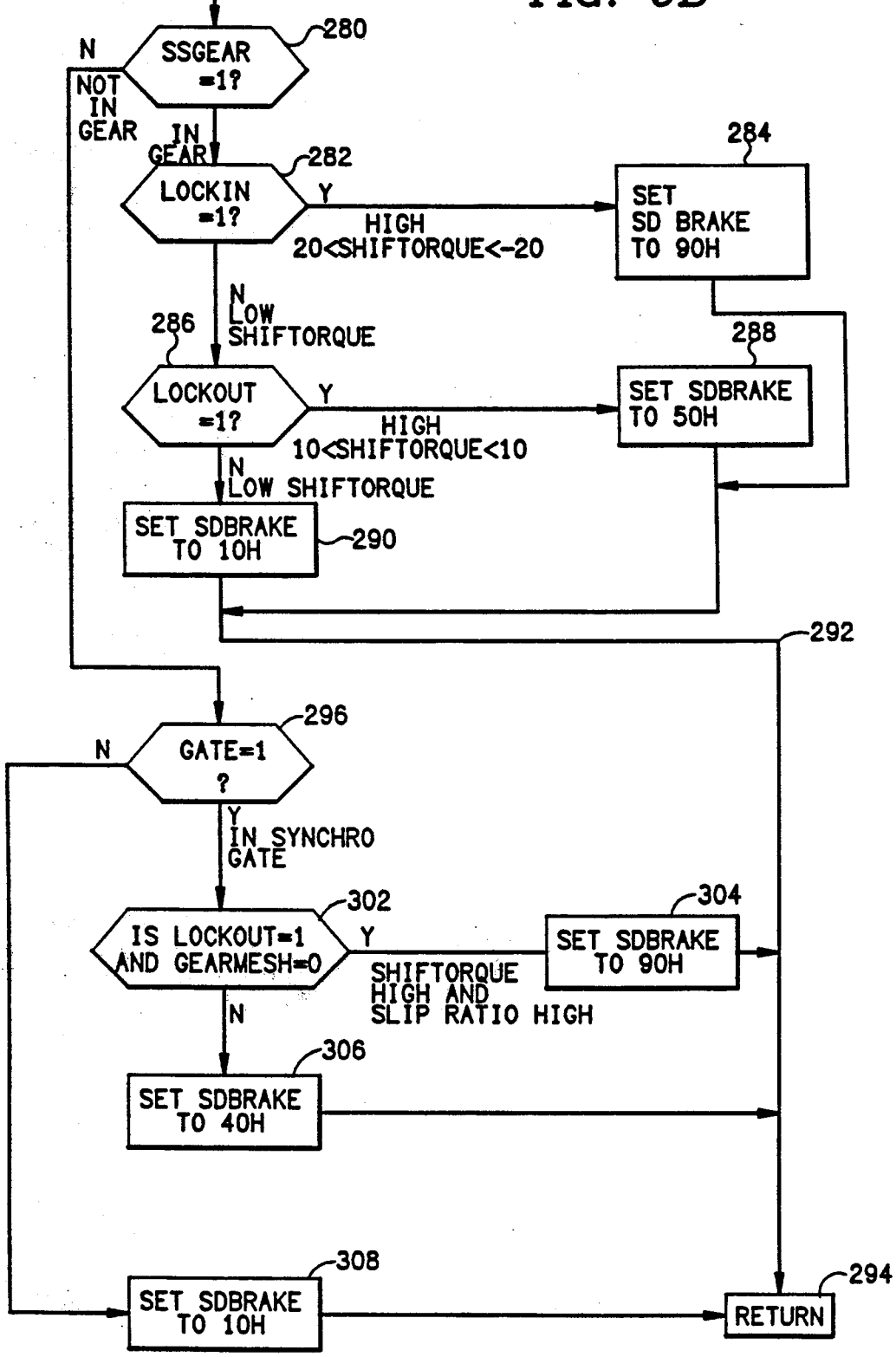

Referring to FIGS. 9A and 9B, there is shown a flow chart for the software which is run by the microprocessor 110 in FIG. 7 to control the operation of the solenoid 94 in the simulated gearshift. System operation is initiated at step 210 in FIG. 9A upon occurrence of a power on or reset condition.

The main loop of the game or simulator system contains a number of routines and subroutines which are not relevant to the invention being claimed herein. Therefore the details of the main loop are not given herein. One of the routines in the main loop however is the routine to handle the electrically operable solenoid 94. This routine is symbolized by a start gearbox routine block 224 in FIG. 9A. This routine may be called periodically as by a timed interrupt or it may be called whenever the CPU running the main loop reaches a point in the main loop execution where it is appropriate to call the gearbox simulation handling routine.

In a block 226, the control unit 16 sets a duty cycle variable to a preselected number to cause an electromagnetic clutch, such as that described in the incorporated reference, to impose a certain minimum amount of drag on the gearshift lever and maintain the electromagnet in close proximity to the brake plate. This duty cycle variable is the digital number sent to the latch 196 and the counters 190 and 192 in FIG. 8. In the case of the solenoid 94 of the present invention, the solenoid plunger is maintained in a bottomed position so as to minimize flight time and thus improve response time. Although block 226 is not necessary in an embodiment having a solenoid, it provides a back-up strategy for introducing drag on the gearshift lever.

The next step in the gearbox simulation solenoid handling routine is symbolized by a block 228. In this step the position sensors are read to determine the gearshift lever position in the simulated gearshift pattern. This involves addressing the position sensor interface circuits 126 and 128 shown in FIG. 7 and reading the resistance values of the potentiometer used as the X and Y position sensors, shown as devices 62 and 72 in FIG. 7. Basically the purpose of this step is to determine the position of the environment, with electrical noise being inductively coupled into the various signal lines in the circuitry, it is possible to get very erratic readings from the X and Y position sensors. Thus, although optional, it is preferred to use a software filter to limit this slew rate to a predetermined maximum rate to prevent noise spikes from causing the system to wrongly interpret the position of the gearshift lever. That is, if, for some reason, the position sensor outputs are changing at greater than the predetermined slew rate, because of noise, for example, the software filter limits the maximum slew rate to a predetermined amount. This provides for smoother operation of the system and eliminates a granularity which may sometimes otherwise occur.

Another problem which can occur arises in the interpretation of the outputs of the position sensors. The position sensor output may have any one of a number of different readings for the same gearshift lever position depending upon the angular orientation of the axle of the potentiometer or position sensor when it is connected with the gearshift lever mechanism. Thus, in construction from one unit to the next, different position sensor readings may be obtained even though the gearshift lever is in the position of simulated second gear on all of the various units in any given sample lot. However, what is constant for all the units is the angle through which the gearshift lever 32 moves in transitioning between any two gears or any two positions. Thus, the angle through which the potentiometer shaft turns for any given transition in the simulated gearshift pattern is the same. Accordingly, a second function of the software filter is to eliminate the effect of these construction variances from the operation of the system.

This is done using "software windows". These windows are "moved" to eliminate the effect of the construction errors, and then, the position of the gearshift lever in the simulated gearshift pattern is determined by comparing the X and Y position sensor readings to the software window. For example, in the preferred embodiment, it is known that 92 digital counts represents the total angle through which the X position sensor moves when the gearshift lever is moved horizontally through the simulated gearshift pattern for maximum X excursion. That is, the analog output signal from the X transducer maps to two digital numbers separated by 92 when the X position transducer is rotated through the maximum X excursion. Similarly, the maximum Y excursion maps to two digital numbers separated by 89. An additional function of the software filter then is to adjust two software variables (hereafter software variables will be called variables and represent memory locations that contain numbers which vary but which may always be found at the address or whatever address is assigned currently to the variable in question) called MPOTY and MPOTX so as to adjust the positions of the software windows to eliminate construction errors from affecting the system. The values MPOTX and MPOTY define the positions of the ends of the X and Y software windows, respectively. The constants 92 and 89 determine the positions of the other ends of the windows.

The above described functions of the software filter are symbolized by a block 230 in FIG. 9A. The software filter limits the slew rate by comparing the digital value received from the X position sensor interface to a variable which defines the maximum desired slew rate for X transitions. If the maximum desired slew rate is exceeded, the software filter assigns a value for the X position transducer output which changes from its last output value at the maximum desirable slew rate. The same is done for Y transitions. Essentially, the raw values from the X and Y position sensors are read and accepted except if they are changing at values greater than the maximum desired slew rate. If they are changing faster than the desired slew rate, the raw potentiometer values are adjusted so that they are changing at the desired slew rate.

After the slew rate limitation function of the software filter is performed, a second function of adjusting the software windows is performed. This function is done by comparing the raw potentiometer values as adjusted by the slew rate limitation routine (hereafter routines, subroutines or sequences of instructions may sometimes be referred to as code) to the values for MPOTX and MPOTY. If the raw potentiometer readings received (as adjusted) are greater than the MPOTX and MPOTY variables, these variables are incremented, thereby adjusting the positions of the X and Y software windows upwardly.

If the raw potentiometer values (sometimes hereafter called POT values) do not exceed the MPOTX and MPOTY values, they are tested against the lower windows, i.e., MPOTX minus 92 and MPOTY minus 89. If the raw POT values are lower than the lower ends of the windows, then the MPOTX and MPOTY variables are decremented. This slides the software position comparison windows downward. These comparison and adjustment steps for the MPOTX and MPOTY variables are performed each time the software filter step in the block 230 is performed. This has the effect of continually adjusting the software position comparison windows until the windows encompass the raw POT values received from the slew rate limiting code.

Next, it is necessary to determine the actual X and Y gearshift lever position in the simulated gearshift pattern. This code is symbolized by a block 232 which represents a series of tests which compare the software filtered POT values, called the POTX and POTY variables, to various locations in the X and Y software windows used for position comparison. These various locations define the positions of, for example, first, second, third, fourth and reverse gears as well as the neutral band and the synchro bands separating neutral from the various gear positions.

Figure 10:
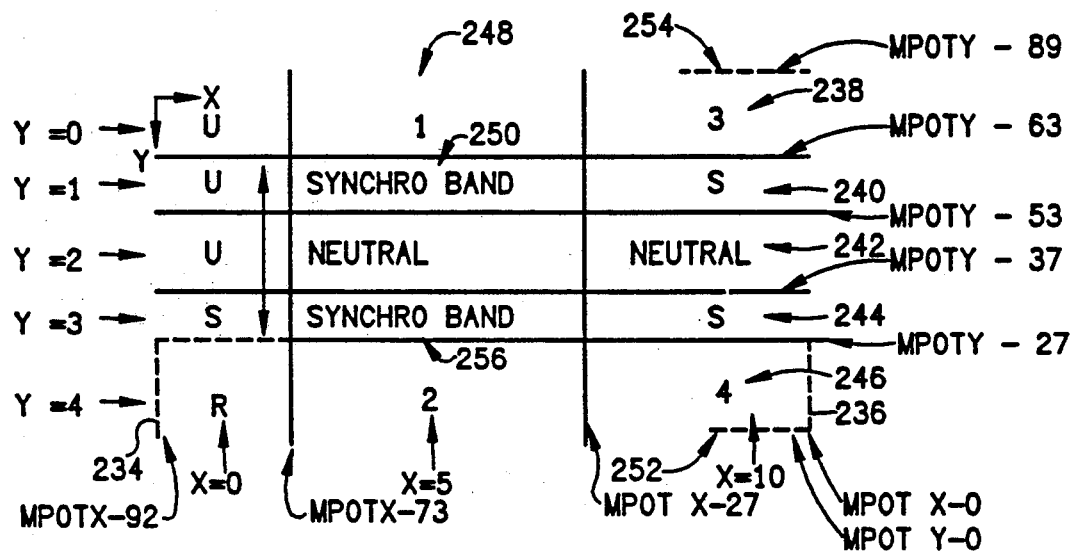
FIG. 10 is a diagram of the simulated gearshift pattern illustrating the software windows used for position determination.

FIG. 10 illustrates how a typical 4-speed simulated gearshift pattern is defined in terms of X and Y coordinates for the gear positions and the neutral band. The step in the block 232 of FIG. 9A comprises a plurality of tests wherein the X and Y position sensor raw data, POTX and POTY, as filtered by the software filter step in the block 230, are compared to a plurality of locations in the software windows for X and Y position determination. Essentially, FIG. 10 illustrates that the X position determination is performed using two dividing lines along the horizontal axis of the simulated gearshift pattern as the values against which the POTX and POTY values are tested. These two dividing lines are: MPOTX minus 73; and MPOTX minus 27, as labeled in FIG. 10. The software window for X position determination is defined by the dashed lines 234 and 236 in FIG. 10. The line 234 defines the lower extent of the software window as defined by the variable MPOTX minus 92, whereas the dashed line 236 represents the upper end of the software window as defined by the variable MPOTX. The raw X position data, as filtered by the software filter step 230 in FIG. 9A, is the POTX variable.

The code represented by the block 232 is a pair of tests which compare the POTX variable to the position in the software window defined by the variable MPOTX minus 73 and MPOTX minus 27. If POTX is less than MPOTX minus 73, then a variable X is set to zero, which means that the shift lever is somewhere to the left of the dividing line represented by the variable MPOTX minus 73. This means that the gearshift lever is either in reverse or in some position which is undefined as represented by the U's in the simulated gearshift pattern of FIG. 10.

If the POTX variable is greater than MPOTX minus 73, then another comparison is made to determine if the POTX variable is greater than the variable represented by MPOTX minus 27. If it is greater, then the variable X is set to 10, meaning that the gearshift lever is either in third gear as shown at 238, or is in the synchro band for third gear at 240, or is in the neutral band at 242, or is in the synchro band for fourth gear at 244, or is in fourth gear as shown at 246, i.e., is somewhere in the band labeled X=10 in FIG. 10. Exactly where the gearshift lever 32 is positioned is not known until the Y position determination is made by other code represented by the block 232.

Previous to the two X position determination tests just described, the variable X was set equal to 5. Thus, if the second test just described has failed, then no change in the variable X is made, and the variable X remains at the value 5, meaning that the simulated gearshift lever is somewhere in the band labeled X=5 in FIG. 12. This means that the simulated gearshift lever can either be in the position for first gear at 248 or the synchro band or first gear at 250, etc.

Following the X position comparison tests, there is code which represents a further series of tests to determine the Y position. This code is also represented by the block 232 in FIG. 9A and may either precede or follow the code for determining the X position. There are more tests for comparison of the software filtered POTY position variable than there were for the filtered POTX position variable. The reason for this is that there are two synchro bands that must be accounted for in the simulated gearshift pattern 34 (FIG. 1) so that the slight increase in resistance on an actual gearshift lever when transitioning into a gear from neutral, or out of a gear into neutral, may be simulated. It is to be understood that is not necessary to simulate the synchro bands, and a simple embodiment of the shifter operates without doing so.

In the embodiment of the shifter having synchro band simulation, the slight increase in force is due to the operation of the synchronizing elements in actual transmissions which serve to cause the two gears that are meshed to be rotating at approximately the same angular velocity prior to meshing of the gears such that gear clashing is minimized. The software window for comparison to the filtered POTY position data for purposes of Y position determination is defined by the dashed lines 252 and 254 representing, respectively, the variables MPOTY and MPOTY minus 89. The various possible Y positions are as labeled at the left side of FIG. 10, i.e., a variable Y may be set to any of the valued 0-4. The Y variable values 1 and 3 represent the simulated gearshift lever 32 being in the simulated synchro bands 250 and 256. The Y position determination represents a series of tests to determine if the filtered Y position data MPOTY is greater than a number of positions within the Y position software window. These various variable values are labeled on the right edge of FIG. 10 as the variables MPOTY minus 89, MPOTY minus 63, MPOTY minus 53, MPOTY minus 37 and MPOTY minus 27.

This series of tests start out by comparison of the variable value POTY to determine if it is greater than the variable value MPOTY minus 27. If it is, the variable Y is set equal to 4. Then, the variable POTY is compared to the variable MPOTY minus 37 to determine if it is greater than this value. If it is, then Y is set equal to 3. If it is not, the POTY variable is compared to MPOTY minus 57. If it is greater, then Y is set equal to 2. This process continues until the Y position is determined.

Once the X and Y variable values have been defined, the position in the simulated gearshift pattern of FIG. 10 is known. This is done by combining the X and Y variable values to generate a variable Z. This variable Z is used as the address into an array which yields the gearshift lever position for the simulated transmission.

Another array contains data regarding the gear ratio of the various gears in the simulated transmission. The slip ratio data for any particular gear in the simulated gearshift pattern represents the difference in rotational speed between the gear connected to the engine and the gear connected to the wheels of the simulated vehicle. For example, in the case of second gear, the slip ratio would be the difference in rotational velocity between the gear coupled to the engine which is to be engaged with the gear called "second gear" which is connected to the wheels. If the slip ratio is too high between these two gears, then the gears cannot be meshed without excessive grinding in an actual transmission. The slip ratio data is written into memory by a model calculation processor which is not shown and which is not part of the system of the invention. The model calculation processor receives other user inputs which define the state of the simulated vehicle and applies them to generate display data showing how the vehicle is responding in the simulated universe to user inputs and generates other data such as the slip ratio data described above and shift torque data.

The shift torque data represents the amount of torque passing through the simulated transmission. This shift torque depends upon the status of the car and, in particular, upon the status of the power being applied to the engine and whether or not the clutch is engaged or not engaged. Shift torque is zero if the clutch is disengaged such that no power is being coupled to the simulated transmission. The manner in which the shift torque and slip ratio data is used will be described in more detail.

A block 266 in FIG. 9A represents the process of getting the shift torque and slip ratio variable values from the model calculation processor. The block 266 represents the continuous updating of these variable values.

The next block, a block 268, represents the process of setting the LOCKOUT variable. This variable is another one of the setup variables which plays a role in the decision making code to be described below which control the operation of the solenoid. The LOCKOUT variable is set to zero if the shift torque is between 10 and −10. Otherwise, LOCKOUT is set to 1. When LOCKOUT is set to 1, high torque values exist meaning that it should be very difficult or impossible to change gears in the transmission. In an actual transmission, it would be difficult or impossible to pull the transmission out of gear if high shift torque was passing through the transmission. Further, it would be difficult or impossible to put the transmission in a gear from neutral if large amounts of torque were being applied to the gear connected to the engine.

A block 270 represents the process of setting the LOCKIN variable for current conditions. LOCKIN is set equal to 1 for high shift torque values greater than 20 or less than −20. Otherwise, LOCKIN is set equal to zero. The LOCKOUT variable is used to operate the solenoid 94, or an electromagnetic clutch of the type disclosed by the incorporated reference, to prevent entering a gear if the shift torque is greater than 10 or less than −10. The LOCKIN variable is used to operate the solenoid 94, or electromagnetic clutch, so as to lock the simulated transmission in gear if the shift torque is greater than 20 or less than −20. The difference in these ranges reflects the conditions which would be present in an actual transmission. In the simple embodiment of the gearshift, both LOCKIN and LOCKOUT can be combined into one variable and, thus, the difference between the two variables is ignored.

The next step, represented by a block 272, represents the process of using the value of the Z variable to enter an array called SGEAR to determine what gear the simulated transmission is in if any. That is, the SGEAR table defines the simulated gearshift pattern in terms of the Z variable. For any given value of Z, there is a linear array entry which defines the gear represented by that Z value or the synchro band represented by that Z value in terms of the gear number and, in some embodiments, the slip ratio for that gear. In other embodiments, a separate table for the slip ratio data may be used. If the simulated transmission is engaged in any gear, a variable SSGEAR is set equal to 1. Otherwise, the variable SSGEAR is set equal to zero. The variable SSGEAR is another one of the setup variables which is necessary in making determinations as to how to operate the solenoid 94, or electromagnetic clutch.

A block 274 represents the process of entering another table called NGEAR to determine in which synchro gate the simulated gearshift lever resides, if any. This information is retrieved from the NGEAR table using the Z variable as an address. A GATE variable is set according to the results of this table access. The GATE variable is set equal to 1 if the simulated gearshift lever is in the position of any synchro gear. Otherwise, the GATE variable is set to zero.

A block 276 represents the process of using the Z variable as an address to enter a gear slip array. The gear slip array contains the slip ratio data for all of the possible ears in the simulated transmission. This data is continuously updated by the model calculation processor, and the entries of this gear slip array are continuously updated as symbolized by the process of a block 266. Having accessed this array, the current slip ratio for the appropriate gear is determined and the value of GEARMESH variable is set accordingly. The GEARMESH variable is set equal to zero if the slip ratio is greater than 150 or less than −150. GEARMESH equals zero when the slip ratio is too high to allow meshing of the gears required by the proposed manipulation of the simulated transmission by the operator. For example, if the simulated vehicle is traveling at a simulated velocity of 90 mph, the GEARMESH variable would usually be set such that the operator will not be allowed to place the simulated transmission in first gear or reverse. In the simple embodiment of the gearshift, GEARMESH is not used. As a result, the shifter simulation is somewhat less reflective of an actual transmission.

This completes the setup of all of the solenoid control variables. Processing now turns to the decision making phase wherein the conditions in the simulated transmission are determined by examination of the setup variables, and appropriate digital words are generated for causing the solenoid 94, or electromagnetic clutch, to generate frictional forces appropriate to the situation to emulate the forces which would be felt by the manipulation of an actual gearshift lever in a similar situation in an actual vehicle.

The code for controlling the solenoid 94, or electromagnetic clutch, begins with a transition along a path 278 from the block 276 to a test 280 in FIG. 9B. The purpose of this test is to check the value of the SSGEAR variable to determine whether or not the simulated transmission is in gear. If it is, SSGEAR is equal to one and a transition to a test 282 along the "yes" path (marked Y; "no" paths are marked N) occurs. The purpose of the test 282 is to determine if the LOCKIN variable is equal to one so as to determine the level of the shift torque. If LOCKIN is equal to one, high shift torque exists and a transition along the "yes" path to an I/O operation 284 is performed. This I/O operation sets the value of a variable SDBRAKE to 90H (90 in the hexadecimal numbering system or base 16, i.e., 144 in the decimal numbering system or base 10) representing a very high drag in the gearshift lever such that the gearshift lever cannot be moved.

If the shift torque is low, a transition along the "no" path to a test 286 is performed. The purpose of the test 286 is to determine the level of shift torque as reflected by the LOCKOUT variable. This variable is set equal to one for a different range of shift toques than the variable LOCKIN as discussed above. If LOCKOUT is equal to one, high shift torque exists in a transition along the "yes" path to an I/O operation 288 is performed. In the I/O operation 288, the SDBRAKE variable is set to 50H. As in the case of the I/O operation 284, the hex variable set in the I/O operation 288 is written to the counters illustrated at 190 and 192 in FIG. 8 and thereby controls the duty cycle. This duty cycle sets the amount of drag imposed by the solenoid 94, or electromagnetic clutch, on the gearshift lever 32. The duty cycle number 50H represents a level of friction where the gearshift lever 32 may be moved, but not easily.

If LOCKOUT is equal to zero, low shift torque exits and a transition to an I/O operation 290 is performed. The I/O operation 290 sets the SDBRAKE variable to 10 hex which represents a low duty cycle and very low friction on the simulated gearshift lever.

After performing any of the I/O operations 284, 288 and 290, a transition along a path 292 is performed to a return operation 294 wherein control is returned to the main loop from the solenoid routine.

If the results of the test 280 are that the simulated transmission is not in gear, a transition along the "no" path is made to a test 296. In the simple embodiment, the test 296 and associated actions taken along the "yes" path are omitted and control flows from the block 280 immediately to a block 308.

The test 296 determines whether the value of the GATE variable is equal to one. If it is, the simulated gearshift lever is in the position of a synchro gate, and a transition along the "yes" pathway to a test 302 is performed.

The test 302 determines if LOCKOUT is equal to one and the variable GEARMESH is equal to zero. If these two conditions are both true, then the result of the test 302 will be true and a transition along the "yes" path to an I/O operation 304 will be performed where the SDBRAKE variable is set to 90 hex. A transition along the "yes" pathway means that high shift torque exists and a high slip ratio exists. In an actual transmission under these conditions, an operator would not be allowed to place the transmission in gear by the operation of the synchro gates. Therefore, the duty cycle is set to impose a high degree of friction on the simulated gearshift lever such that the gearshift lever cannot be moved. If either the shift torque is low or the slip ratio is low or both are low, a transition along the "no" pathway to an I/O operation 306 occurs. In the I/O operation 306, the SDBRAKE variable is set to 40 hex to impose a medium level of drag on the simulated gearshift lever.

If the test 296 determines that the variable is equal to zero, then the simulated transmission is neither in gear nor in a synchro gate. In such a case, a transition along the "no" pathway to the I/O operation 308 is performed. In the I/O operation 308, the SDBRAKE variable is set to 10 hex to impose a minimum level of drag on the gearshift.

After any of the I/O operations 304, 306 or 308 are performed, a transition is made to the return block 294 where return to the main loop is performed.

Although the invention has been described in terms of the preferred embodiment disclosed herein, those skilled in the art will appreciate many modifications which may be made without departing from the true spirit and scope of the invention. All such modifications are intended to be included within the scope of the claims appended hereto.

What is claimed is:

1. A gearshift for a simulated vehicle, said gearshift comprising:
   a gearshift lever;
   a first axle connected to said gearshift lever so as to provide movement of the gearshift lever along a first axis;
   a second axle normal to said first axle connected to the gearshift lever so as to provide movement of the gearshift lever along a second axis;
   a first position sensor connected to said gearshift lever for transducing mechanical position along said first axis into a first sensor signal;
   a second position sensor connected to said gearshift lever for transducing mechanical position along said second axis into a second sensor signal;
   means for selectively locking the gearshift lever in a plurality of predetermined positions and for providing variable resistance when shifting said gearshift lever out of and between said plurality of predetermined positions;
   a solenoid in communication with said locking and resistance means to selectively prevent movement of said locking and resistance means and to provide variable resistance to said locking and resistance means when shifting said gearshift lever into as well as between said plurality of predetermined positions, said solenoid controlled by a solenoid signal; and
   a control unit which simulates an engine and a transmission, and generates engine and transmission modeling information, said control unit responsive to said first and second sensor signals and at least partially therefrom determines when to generate said solenoid signal so that said locking means secures said gearshift lever in one of said predetermined positions and when to modulate said solenoid signal so that a selected resistance is applied to said locking and resistance means.

2. The gearshift defined in claim 1, wherein said control unit includes means for modulating said solenoid signal so that a selected resistance is applied to said gearshift lever by said locking means.

3. The gearshift defined in claim 1, wherein said control unit further determines gear synchronization and clutch disengagement before determining when to generate or modulate said solenoid signal.

4. The gearshift defined in claim 2, additionally comprising a clutch position sensor in electrical communication with said control unit.

5. The gearshift defined in claim 2, wherein said control unit imposes a force to restrain movement of said gearshift lever when moving through a synchro band.

6. The gearshift defined in claim 2, wherein said transmission modeling information includes simulated transmission torque data.

7. The gearshift defined in claim 2, wherein said locking and resistance means includes a rotatable arm connected on one end to the piston of said solenoid and a spring bias, a detent plate coupled to said gearshift lever selectively engaging with a nub on the rotatable arm.

8. The gearshift defined in claim 2, wherein said first position sensor includes a potentiometer.

9. The gearshift defined in claim 2, wherein said second position sensor includes a potentiometer.

10. The gearshift defined in claim 2, wherein said predetermined locking positions are defined by a gearshift gate.

11. The gearshift defined in claim 10, wherein said gearshift gate includes a rotatable arm pivotally secured on one end to the inner face of the gate and a spring bias coupled between the other end of the arm and the gate for resisting entry of the gearshift lever into a simulated reverse gear position so as to prevent inadvertent shifting into reverse.

12. A gearshift mechanism for a driver training system, comprising:
   a gearshift lever that generates gearshift lever position signals in response to movement of said gearshift by an operator;
   a locking mechanism capable of selectively locking said gearshift lever in a plurality of gearshift lever positions and providing a variable resistance when shifting said gearshift out of and between said plurality of gearshift positions;
   a solenoid coupled to said locking mechanism that selectively prevent movement of said locking mechanism and provides variable resistance to movement of said mechanism; and
   a control unit which simulates an engine and a transmission by producing data including a level of torque applied through said simulated transmission and a series of slip ratios between gears of said simulated transmission and based at least partially thereon determines whether resistance to the movement of said gearshift lever from said first gearshift lever position to said second gearshift lever position should be applied, said solenoid control unit communicating a solenoid control signal to said solenoid based on such determination, said solenoid control signal varying the force generated by said solenoid and thereby varying the mechanical resistance of said locking mechanism to movement of said gearshift lever into as well as out of said gearshift positions.

13. The gearshift defined in claim 12, wherein said locking mechanism includes a rotatable arm connected on one end to the piston of said solenoid and a spring bias, a detent plate coupled to said gearshift lever selectively engaging with a nub on the rotatable arm.

14. The gearshift defined in claim 12, wherein said resistance data is responsive to clutch position.

15. The gearshift defined in claim 12, wherein said resistance data is responsive to transmission torque.

16. The gearshift defined in claim 12, wherein said resistance data is responsive to the relative slip ration of the gears to be engaged.

17. The gearshift defined in claim 12, wherein said resistance data is responsive to positioning the gearshift lever in a synchro gate.

18. The gearshift defined in claim 12, wherein said solenoid control signal is responsive to a pulse width modulation circuit so that varying of solenoid force is accomplished cyclically according to a duty cycle.

19. The gearshift defined in claim 12, additionally comprising position sensors for determining the position of the gearshift lever in an X-Y coordinate system.

20. The gearshift defined in claim 19, wherein said solenoid control circuit includes a software filter so as to limit slew rate of said position sensors.

* * * * *